US008293356B2

(12) United States Patent
Merrill et al.

(10) Patent No.: US 8,293,356 B2
(45) Date of Patent: Oct. 23, 2012

(54) SUBSURFACE INCLUSIONS OF OBJECTS FOR INCREASING INTERLAMINAR SHEAR STRENGTH OF A CERAMIC MATRIX COMPOSITE STRUCTURE

(75) Inventors: Gary B. Merrill, Orlando, FL (US); Jay A. Morrison, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 607 days.

(21) Appl. No.: 12/464,512

(22) Filed: May 12, 2009

(65) Prior Publication Data

US 2010/0291349 A1   Nov. 18, 2010

(51) Int. Cl.
*B32B 3/00* (2006.01)
*B32B 17/12* (2006.01)
*B32B 18/00* (2006.01)

(52) U.S. Cl. ...... 428/166; 428/156; 428/172; 428/293.4

(58) Field of Classification Search .................. 428/111, 428/113, 114, 156, 172, 210, 293.4, 323, 428/328, 330, 161, 162, 166
See application file for complete search history.

(56) References Cited

U.S. PATENT DOCUMENTS

| | | | |
|---|---|---|---|
| 4,919,991 A * | 4/1990 | Gadkaree | 428/113 |
| 6,617,013 B2 | 9/2003 | Morrison et al. | |
| 6,746,755 B2 | 6/2004 | Morrison et al. | |
| 6,984,277 B2 | 1/2006 | Morrison et al. | |
| 7,153,096 B2 | 12/2006 | Thompson et al. | |
| 7,247,002 B2 | 7/2007 | Albrecht et al. | |
| 7,255,535 B2 | 8/2007 | Albrecht et al. | |
| 7,387,758 B2 | 6/2008 | Merrill et al. | |
| 7,549,840 B2 * | 6/2009 | Subramanian et al. | 415/173.1 |
| 2003/0059577 A1 | 3/2003 | Morrison et al. | |
| 2005/0022921 A1 | 2/2005 | Morrison et al. | |
| 2006/0120874 A1 | 6/2006 | Burke et al. | |
| 2006/0182971 A1 | 8/2006 | Merrill et al. | |
| 2009/0071160 A1 | 3/2009 | Keller et al. | |

* cited by examiner

*Primary Examiner* — Catherine A Simone

(57) ABSTRACT

A ceramic matrix composite (CMC) structure 12 includes a plurality of layers (e.g., 16, 18, 20) of ceramic fibers. The CMC structure 12 further includes a plurality of spaced apart objects 22 on at least some of the plurality of layers along a thickness of the composite structure. The inclusion of the objects introduces an out-of-plane fiber displacement arranged to increase an interlaminar shear strength of the structure.

14 Claims, 2 Drawing Sheets

SUBSURFACE INCLUSIONS OF OBJECTS FOR INCREASING INTERLAMINAR SHEAR STRENGTH OF A CERAMIC MATRIX COMPOSITE STRUCTURE

FIELD OF THE INVENTION

The present invention is generally related to ceramic matrix composite (CMC) structures for use in a high temperature combustion environment, and, more particularly, to structural arrangements for increasing interlaminar shear strength of the CMC structure.

BACKGROUND OF THE INVENTION

Components made from CMC materials permit higher operating temperatures than do metal alloy materials due to the properties of ceramic materials. One example of a high temperature operational environment occurs in state of the art turbine engine applications. The high temperature capability results in reduced cooling requirements, which results in higher power, greater efficiency, and/or reduced emissions from the engine. Conventional CMC components formed from two-dimensional fiber arrangements have sufficient in-plane strength, but may lack sufficient strength to carry interlaminar shear loads.

BRIEF DESCRIPTION OF THE DRAWINGS

The invention is explained in the following description in view of the drawings that show.

DETAILED DESCRIPTION OF THE INVENTION

In accordance with one or more embodiments of the present invention, structural arrangements for fabricating a ceramic matrix composite (CMC) structure are described herein. In the following detailed description, various specific details are set forth in order to provide a thorough understanding of such embodiments. However, those skilled in the art will understand that embodiments of the present invention may be practiced without these specific details, that the present invention is not limited to the depicted embodiments, and that the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent. Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated.

The inventors of the present invention propose structural arrangements designed to increase interlaminar shear strength of a CMC structure. Aspects of the present invention propose an innovative subsurface inclusion of objects that introduce an out-of-plane fiber displacement arranged to increase the interlaminar shear strength of the CMC structure.

Figure 1:
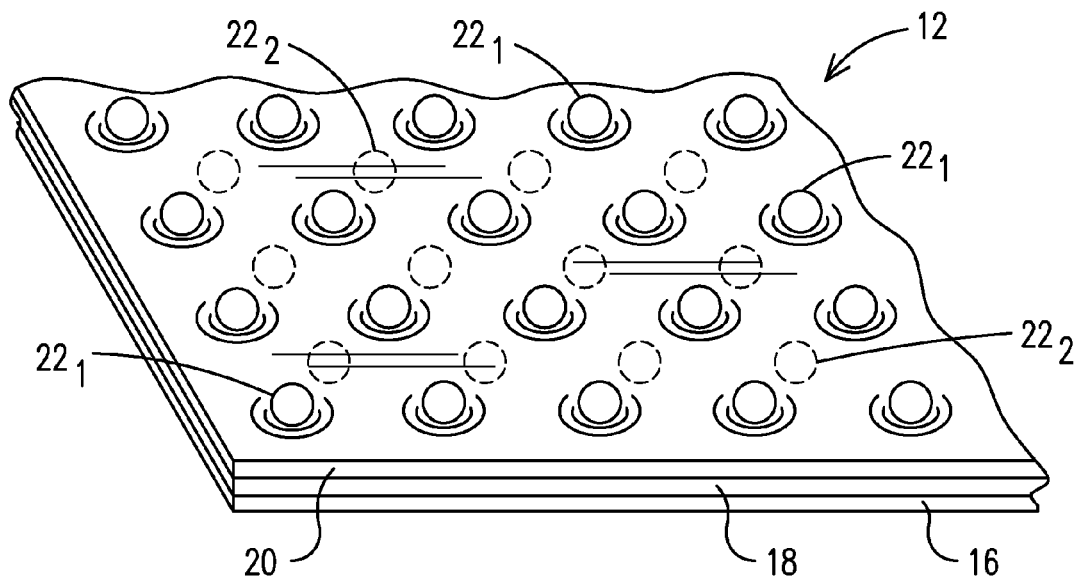
FIG. 1 is an isometric view of an arrangement of successive layers of ceramic fibers in a CMC structure and further illustrates an example arrangement of a plurality of objects that may be disposed between at least some of the plurality of layers.

As shown in FIG. 1, a CMC structure 12 may be formed of a plurality of layers of ceramic fibers, such as layers 16, 18, and 20 and one or more subsequent layers (not shown in FIG. 1) yet to be disposed over layer 20 to form a layering arrangement of successive layers of ceramic fibers. A plurality of spaced apart objects 22 may be disposed on at least some of the plurality of layers along a thickness of the composite structure, which may be but need not be the entire thickness of CMC structure 12. For example objects $22_1$ (represented by solid lines) may be disposed on layer 20 and objects $22_2$ (represented by hidden lines) may be on a layer beneath layer 20.

As will be appreciated by one skilled in the art, as the layered structure is being fabricated, the layered structure may be subjected to a suitable pressurization (or vacuuming) action to ensure a compact joining of the objects between such layers. This may also provide effective distribution of a slurry media (e.g., as in prepreg layups. That is, fiber laminates that are pre-impregnated with the matrix material or precursor material), as may be used to fill any voids that may be created by the presence of the objects between the layers.

Figure 2:
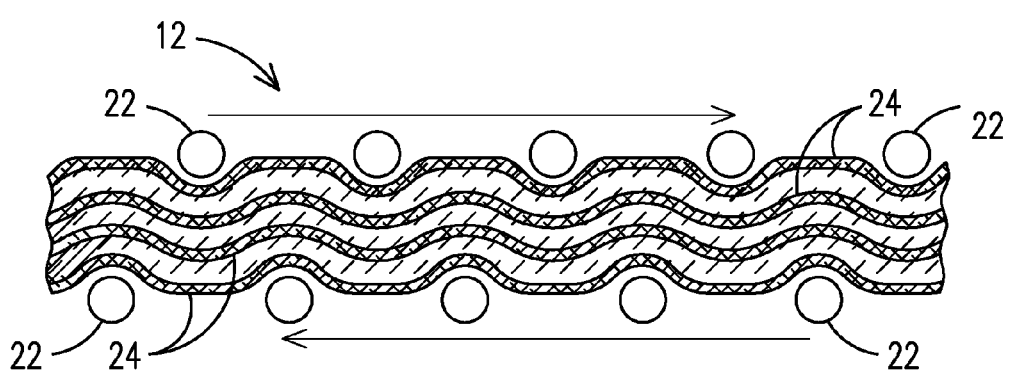
FIG. 2 is a cross sectional view for conceptually visualizing an out-of-plane fiber displacement that results from the object inclusion. The out-of-plane fiber displacement is arranged to increase the interlaminar shear strength of the CMC structure.

As better appreciated in FIG. 2, the inclusion of objects 22 introduce an out-of-plane displacement to fibers 24. This out-of-plane fiber displacement essentially provides a reinforcement arranged to increase the interlaminar shear strength of the CMC structure. That is, the inclusion of objects 22 creates bulk effects within the CMC structure conducive to increasing the interlaminar shear strength of the CMC structure. For example, in a CMC structure embodying aspects of the present invention, the interlaminar shear stress may be advantageously transferred through fiber reinforced plies (resulting from the out-of-plane fiber displacement) rather than just through the matrix phase of the CMC structure. In one example, objects 22 may be spheroid objects distributed over a number of multiple layers with a geometric arrangement (e.g., staggered arrangement) configured to produce a predictable out-of-plane fiber displacement, e.g., sinusoidal out-of-plane fiber displacement. In one example embodiment, every layer of the composite structure may include the out-of-plane displacement, such as an undulated out-of-plane displacement.

Examples of spheroid objects may be spheres, ellipsoids, and objects free of corners. The spheroids may comprise different physical characteristics, such as different size, different materials, and/or different shapes, as may be provided by suitable refractory aggregates (e.g., oxide aggregates).

Figure 3:
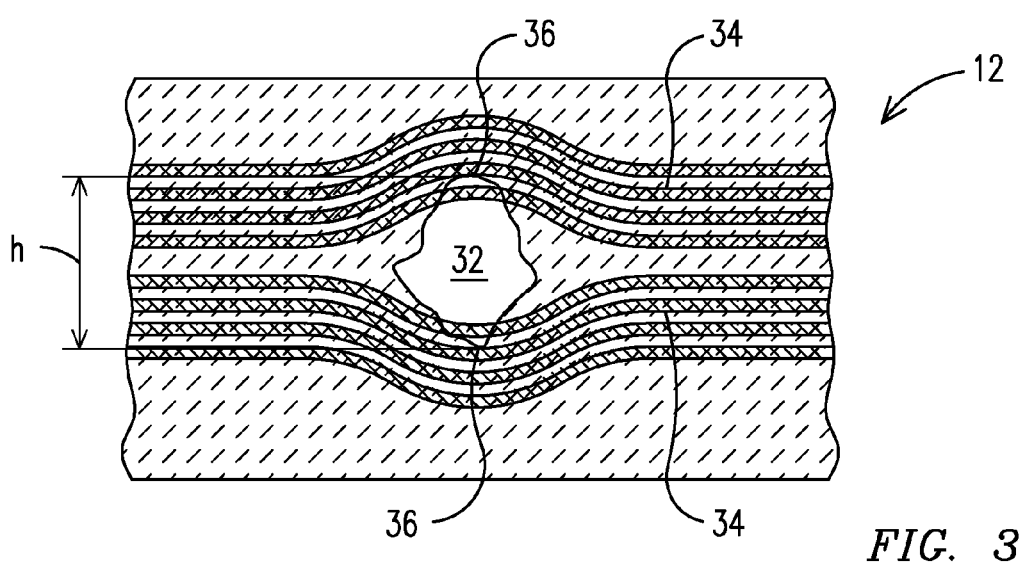
FIG. 3 is a cross sectional view illustrating an angular object arranged to penetrate into adjoining layers to provide a degree of interlocking therebetween.

As illustrated in FIG. 3, in one example embodiment one or more objects (e.g., object 32) may be configured with a sufficient length (e.g., height h) dimension to penetrate into adjoining fiber layers 34 and may include respective angulated ends 36 to provide a degree of interlocking between such adjoining layers. It will be appreciated that irregular shaped objects with non-round ends (e.g., object 32) may be used in combination with the previously described spheroid objects.

Figure 4:
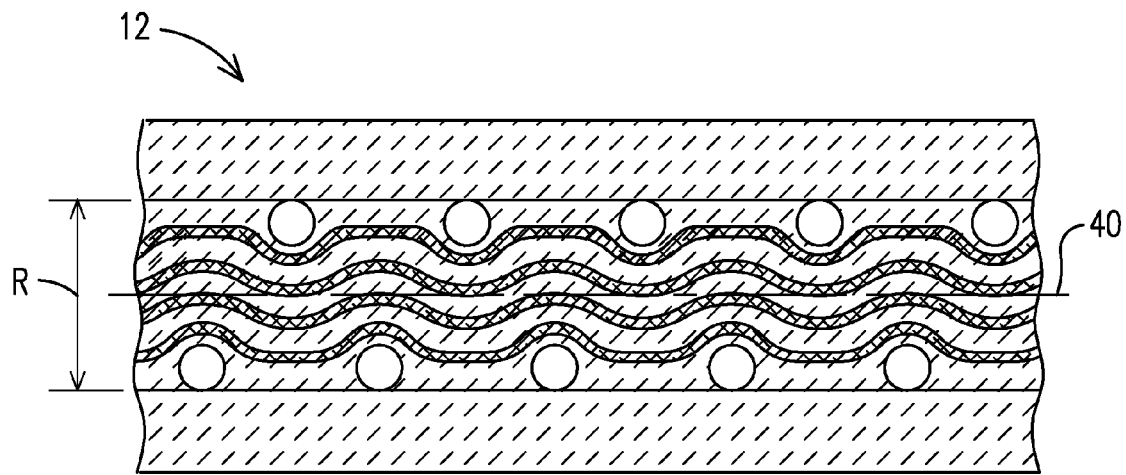
FIG. 4 is a cross sectional view for conceptualizing a distribution of layers with objects on them located in a thickness range (R) extending about a middle section of the composite structure while excluding top and bottom layers.

The layers with objects on them need not extend along the entire thickness of the CMC structure. For example, in one example embodiment, as illustrated in FIG. 4, the layers with objects on them (not shown) may comprise just layers located in a thickness range (R) that extends from beneath a middle section 40 of the composite structure to above the middle section of the composite structure while excluding top and bottom layers. In a first example, the range (R) may comprise approximately 75 percent of an entire thickness of the composite structure. In a second example, the range (R) may comprise 50 percent of the entire thickness of the composite structure. In a third example, the range (R) may comprise 33 percent of the entire thickness of the composite structure.

Figure 5:
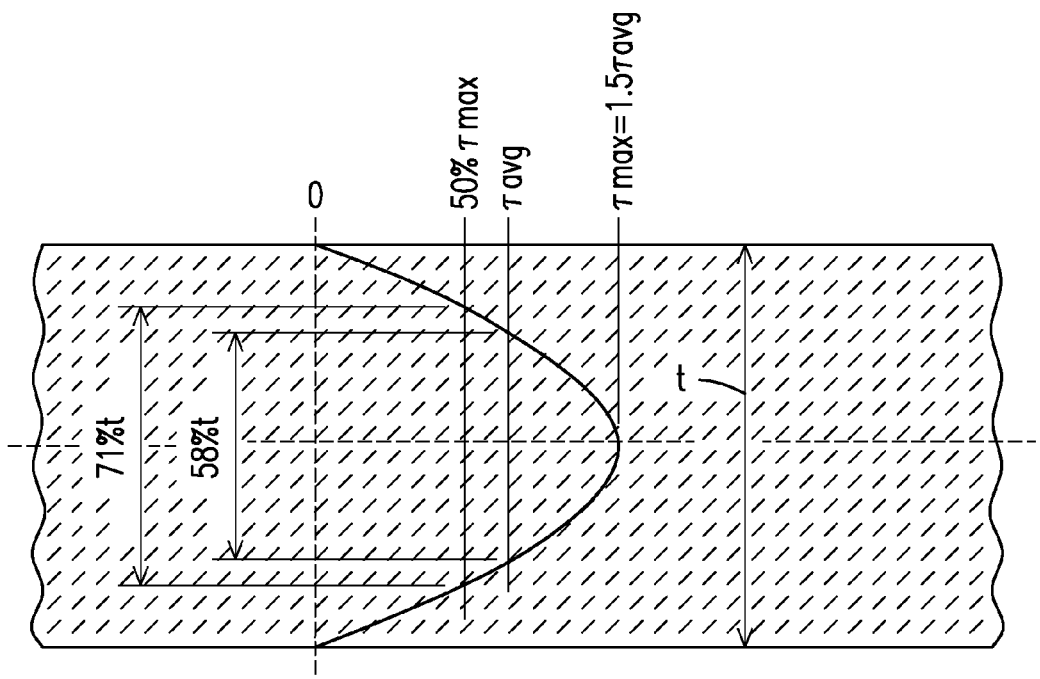
FIG. 5 is a cross-sectional view of a beam-shaped CMC structure, depicting a superimposed plot of the corresponding shear stress distribution as a function of the thickness of the structure.

In one example embodiment, the layers with objects on them may comprise a distribution along the thickness of the composite selected to at least in part counteract an expected interlaminar shear load distribution along the thickness of the composite. For example, for a beam-shaped (e.g., rectangular cross-section) structure, as shown in FIG. 5, the shear stress distribution varies as a parabolic function where the value of the shear stress ($\tau$) peaks at the middle section of the structure (3/2 times an average value of the shear stress distribution) and has zero values at the respective outer edges (e.g., top and bottom layers) of the structure. As further shown in FIG. 5, at about 71% of the thickness (t) of the structure, the shear stress value corresponds to about ½ of the average value of the shear stress distribution, and at about 58% of the thickness the shear stress value corresponds to the average value of the shear stress distribution. See page 114 of textbook by S. Timoshenko titled *Strength of Materials*, Part I, Elementary Theory and Problems, D. Van Nostrand Company, 2nd Ed. 1940. It will be further appreciated that the object distribution in such layers may be selected to further counteract the expected level of interlaminar shear load distribution.

In another example embodiment, the layers with objects on them may have a random layer distribution along the thickness of the CMC structure. For example, instead of arranging an ordered distribution along the thickness of the CMC structure (e.g., every other layer includes objects on them), the layers with objects on them may be randomly distributed along the thickness of the CMC.

While various embodiments of the present invention have been shown and described herein, it will be understood that such embodiments are provided by way of example only. Numerous variations, changes and substitutions may be made without departing from the invention herein. Accordingly, it is intended that the invention be limited only by the spirit and scope of the appended claims.

The invention claimed is:

1. A ceramic matrix composite structure comprising:
a plurality of layers of ceramic fibers; and
a plurality of spaced apart objects on at least some of the plurality of layers along a thickness of the composite structure, wherein the inclusion of said objects introduces an out-of-plane fiber displacement arranged to increase an interlaminar shear strength of the structure, wherein at least some of the objects comprise spheroid objects.

2. The structure of claim 1, wherein the spheroid objects are distributed over said at least some layers with a geometric arrangement configured to produce a sinusoidal out-of-plane fiber displacement.

3. The structure of claim 1, wherein the spheroid objects are selected from the group consisting of a sphere, an ellipsoid, and an object free of corners.

4. The structure of claim 1, wherein the objects further comprise at least some objects having a sufficient length dimension to penetrate into adjoining layers to provide a degree of interlocking therebetween.

5. The structure of claim 1, wherein every layer of the composite structure includes the out-of-plane displacement.

6. The structure of claim 1, wherein said at least some layers comprise just layers located in a thickness range that extends from beneath a middle section of the composite structure to above the middle section of the composite structure while excluding top and bottom layers.

7. The structure of claim 6, wherein said range comprises 75 percent of an entire thickness of the composite structure.

8. The structure of claim 6, wherein said range comprises 50 percent of an entire thickness of the composite structure.

9. The structure of claim 6, wherein said range comprises 33 percent of an entire thickness of the composite structure.

10. The structure of claim 1, wherein said at least some layers comprise a distribution along the thickness of the composite selected to at least in part counteract an expected interlaminar shear load distribution along the thickness of the composite.

11. The structure of claim 10, wherein at least some of the objects comprise objects distributed over said at least some layers in an arrangement selected to further counteract the expected level of interlaminar shear load distribution.

12. A ceramic matrix composite structure comprising:
a plurality of layers of ceramic fibers; and
a plurality of spaced apart objects on at least some of the plurality of layers along a thickness of the composite structure, wherein the inclusion of said objects introduces an out-of-plane fiber displacement arranged to increase an interlaminar shear strength of the structure, wherein said at least some layers comprise a random layer distribution along the thickness of the composite structure.

13. A ceramic matrix composite structure comprising:
a plurality of layers of ceramic fibers; and
a plurality of spaced apart objects on at least some of the plurality of layers along a thickness of the composite structure, wherein the inclusion of said objects introduces an out-of-plane fiber displacement arranged to increase an interlaminar shear strength of the structure, wherein the objects further comprise at least some objects having a sufficient length dimension to penetrate into adjoining layers to provide a degree of interlocking therebetween, wherein the objects having the sufficient length dimension include angulated ends to provide the interlocking.

14. A ceramic matrix composite structure comprising:
a plurality of layers of ceramic fibers; and
a plurality of spaced apart objects on at least some of the plurality of layers along a thickness of the composite structure, wherein the inclusion of said objects introduces an out-of-plane fiber displacement arranged to increase an interlaminar shear strength of the structure, wherein a first group of the objects comprise spheroid objects distributed over said at least some layers to produce a sinusoidal out-of-plane fiber displacement, and further wherein a second group of the objects has a sufficient length dimension to penetrate into adjoining layers and include angulated ends to provide a degree of interlocking therebetween.

* * * * *